United States Patent Office 3,222,728
Patented Dec. 14, 1965

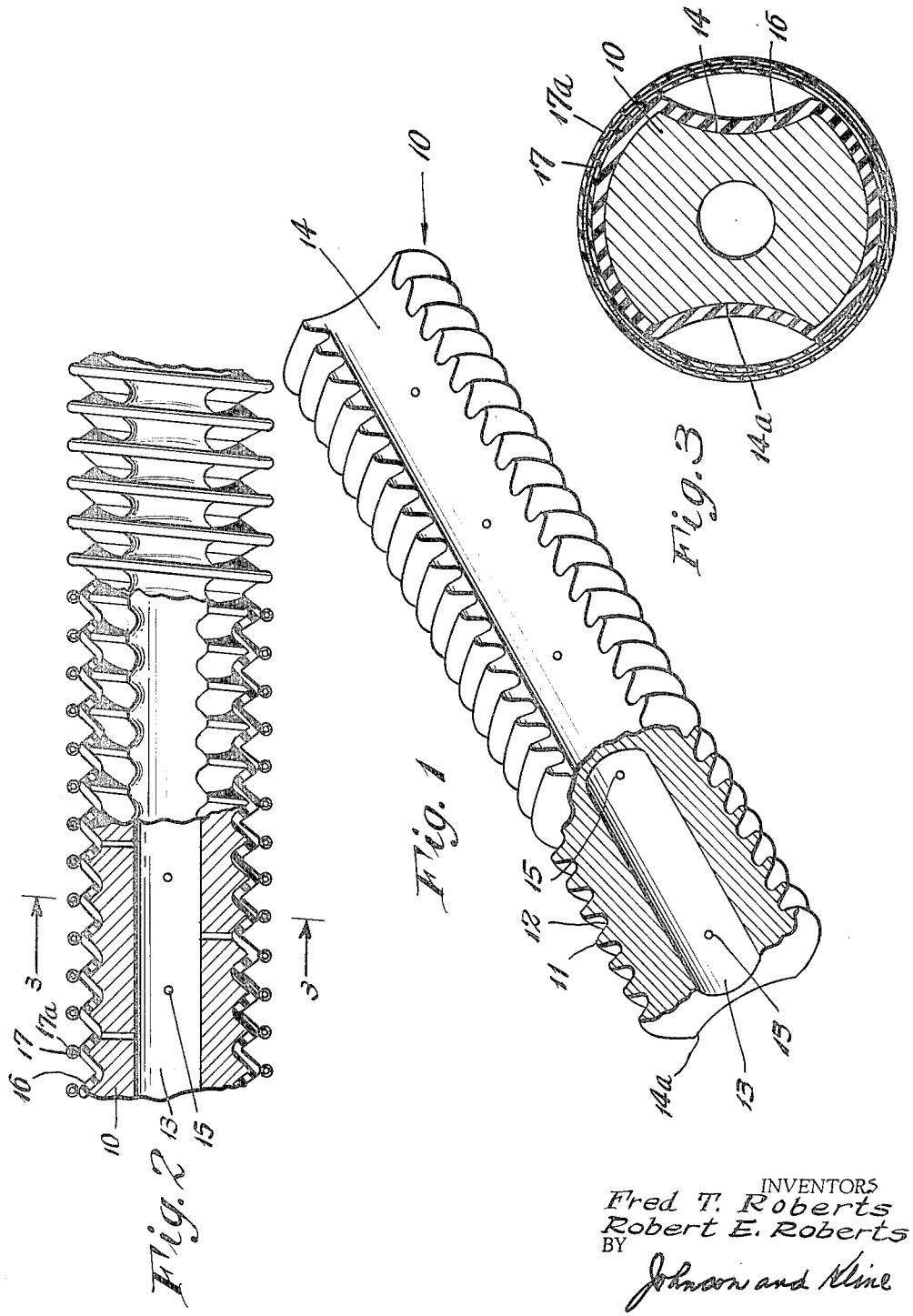

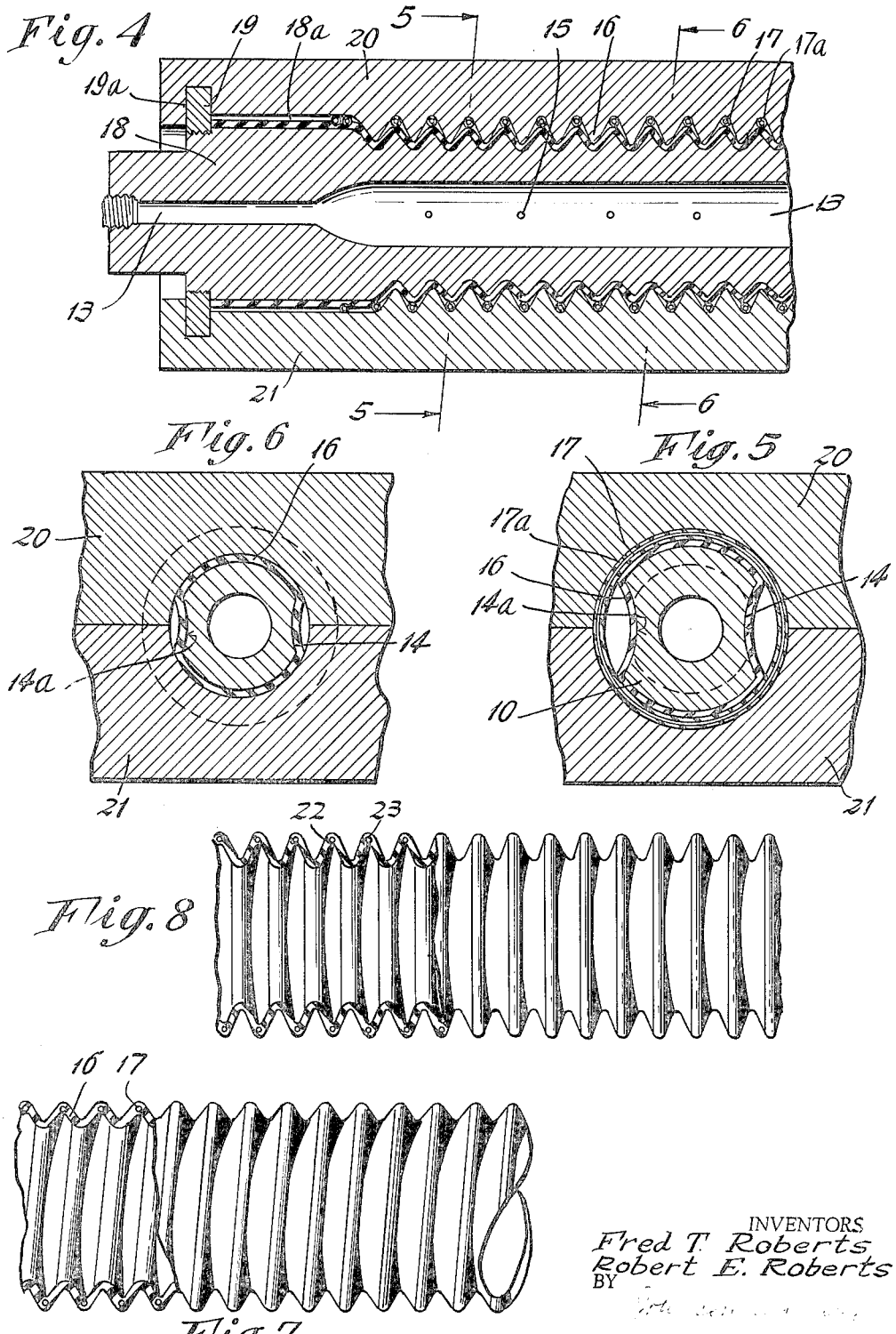

3,222,728
APPARATUS FOR MAKING MOLDED
FLEXIBLE HOSE
Fred T. Roberts and Robert E. Roberts, Wilton, Conn., assignors to Fred T. Roberts & Company, Wilton, Conn., a partnership
Original application June 2, 1958, Ser. No. 739,067, now Patent No. 3,084,086, dated Apr. 2, 1963. Divided and this application July 18, 1962, Ser. No. 210,810
5 Claims. (Cl. 18—35)

This application is a division of our application, application Serial No. 739,067, filed June 2, 1959, issued as Patent No. 3,084,086, granted April 2, 1963.

The present invention relates to an apparatus for making molded flexible hose. More particularly, it relates to an apparatus for the manufacture of such hose comprising vulcanized or cured elastomeric material.

This invention is a modification and improvement over the invention described and claimed in U.S. Patent 2,780,273 issued to one of the co-inventors herein. The aforesaid prior patent describes a method and apparatus for the manufacture of flexible reinforced hose in which a hose body is applied over a longitudinally fluted mandrel wherein the mandrel with the hose body thereon is inserted within a grooved or internally corrugated molding cavity, with a reinforcing member being positioned over the hose body and in alignment with the corrugations of the mold, and wherein fluid pressure is applied to the interior of the hose body to cause it to engage the reinforcing member and the surface of the mold accompanied by the application of heat, with resultant vulcanization or curing of the elastomeric material of which the hose body is composed together with embedment of the reinforcing member therein.

The cylindrical mandrel described in the above mentioned patent is formed with a plurality of circumferentially spaced, parallel, longitudinal depressions or flutes. These are provided for the purpose of permitting the use of a preformed tubular body, having a substantially greater diameter than the diameter of the mandrel so that prior to introduction of the mandrel and hose assembly within a helical or annular reinforcing member, said tubular body may be drawn into contact with the surface of the mandrel by the application of suction through openings therein. This permits the use of a tube having an outer diameter at least as great as but preferably slightly larger than the internal diameter of the coil reinforcement. However, this arrangement has the disadvantage that since the reinforcing members are not engaged by the surface of the tube at the time the assembly is introduced within the mold, suitable alignment of these reinforcements is difficult to obtain. A further disadvantage is that pinching of the tube may occur at the junction of the two mold sections when the mold is closed, at points between convolutions of the reinforcement.

In accordance with the present invention, the foregoing disadvantages are remedied by the utilization of a mandrel which is both corrugated and longitudinally fluted at predetermined points as will be described below. The use of a corrugated mandrel permits the selection of mandrel, tube and mold dimensions such that a fairly close fit is obtained when the mold is closed, thus eliminating the necessity of considerable expansion of the tubular member during vulcanization and at the same time permitting suitable alignment of the reinforcing members on the surface of the tubular body prior to molding. In addition, the reinforcing means can be positioned at the crests of the corrugations, thereby assuring uniform alignment with the corresponding corrugations of the mold. Furthermore the provision of fluted areas longitudinally of the mandrel in alignment with the juncture of the two mold sections eliminates any danger of pinching of the tubular body when the mold is closed.

Other features and advantages of the invention will be apparent from the specification and claims when considered in connection with the drawings in which:

FIGURE 1 illustrates a view partly in cross section and partly in elevation, illustrating the structure of the mandrel of this invention;

FIG. 2 is a view partly in elevation and partly in cross section illustrating the mandrel of this invention when assembled with a tubular layer and reinforcement thereover;

FIG. 3 is a transverse cross section taken along line 3—3 of FIG. 2.

FIG. 4 is a cross-sectional view illustrating the mandrel and tubular body of FIG. 2 positioned within an internally corrugated mold;

FIG. 5 is a transverse cross-sectional view taken along line 5—5 of FIG. 4;

FIG. 6 is a transverse cross-sectional view taken along line 6—6 of FIG. 4;

FIG. 7 is a view partly in elevation and partly in cross section, illustrating the structure of a product obtained in accordance with FIGS. 1 to 6 inclusive;

FIG. 8 is a view partly in cross section and partly in elevation, illustrating the product obtained in accordance with modification of the invention.

As shown in FIG. 1, mandrel 10 which is utilized in the practice of this invention, is helically corrugated, as shown in FIG. 2, being formed with transverse corrugations defined by crests 11 and valleys 12. This mandrel is made of cast or machined metal, preferably aluminum. The mandrel is provided with an internal bore 13 and is formed with a pair of longitudinal depressions or fluted areas 14 and 14a formed at opposite sides of the mandrel. A plurality of openings 15 extend from the bore of the mandrel to the surface thereof, communicating with the valleys of the corrugations. For purposes of convenience, FIG. 1 shows only a segment of the mandrel which may be of any desired length and which may be formed with longitudinally spaced corrugated zones for the purpose of forming a plurality of hose length thereon, if desired. In general, the mandrel is constructed with end portions designed to be positioned within a two-part mold in the manner illustrated in the aforementioned patent. The dimensions of the mandrel are selected so that corrugations of the desired depth and spacing will be formed in the final product and the diameter of the mandrel at the crest of the corrugations is such that when the tubular body is applied thereto the resulting diameter of the tubular body will conform substantially to the inner diameter of the reinforcing means which is applied thereto. FIG. 2 illustrates the assembly of the tubular body and reinforcement on the mandrel prior to molding. A tubular body comprising elastomeric material 16 is applied over the mandrel. This body may be preformed by extrusion and telescoped over the mandrel or the material of the body may be wrapped around the mandrel with overlapping edges joined together by cement. This body may be formed in a single layer of elastomeric material such as vulcanizable rubber, polyvinylchloride or the like, and may be formed with a reinforcement of resilient fabric incorporated therewith. If desired, a layer of open mesh resilient fabric may be applied over the mandrel prior to the application of the tubular layer or the fabric layer may be applied over the tube and bonded thereto by means of rubber cement or the like. After the application of tubular layer 16 suction is applied to the bore of the mandrel through bore 13 and through openings 15 communicating with the surface of the mandrel, thereby serving to draw the tubular layer down against the mandrel so that it will conform to the corrugations thereof as shown in FIGURES 2 and 3 with the tubular body at the sides of the mandrel disposed in the longitudinal flutes in retracted position. At this point, a reinforcing member is positioned over the tube and over the corrugations as shown in FIG. 2. The reinforcement is composed of a helical wire spring 17 or the like, the convolutions or coils of which are coated or covered with a layer of elastomeric material 17a. The ends of the spring are taped down at the ends of the mandrel which are non-corrugated. The diameter of the convolutions of the spring member are such that the coils of the spring will engage the tubular body 16 at the crest of the corrugations. Since the crests are clearly defined, this will permit alignment and positioning of the reinforcing convolutions at the exact crests and since the dimensions of the mandrel, tube and spring, i.e., diameters, length, spacing of turns and corrugations, are predetermined so that the convolutions will snugly engage and grip the tube at the crests and be held by friction, the spacing and alignment of the reinforcement will be maintained until vulcanization is carried out in the mold. This is further insured by the fact that the elastomeric covering on the wire is somewhat resilient and will engage the tube with a certain degree of tension. As shown in FIG. 3, tubular body 16 is drawn against the surface of the mandrel and conformed to the opposed flutes 14 and 14a with the convolution 17 and its coating 17a engaging the surface of the tubular body at the crest of the corrugations but spaced from the sides of the mandrel where the fluting is formed.

As illustrated in FIGS. 4 to 6 inclusive, the assembly of the tubular body and reinforcement on the mandrel with the material of the body in a retracted position in the longitudinal flutes is introduced into an elongated two-part internally helically corrugated mold as shown in FIG. 4, having transverse corrugations corresponding to those of the mandrel. This mold is formed in two sections 20 and 21 preferably hinged at one side. The mandrel is preferably formed with end flanges 19 at one end which fit within corresponding recesses 19a formed in the mold. The mandrel is formed with smooth areas 18 at the ends, defining the collars 18a of the hose. Where a plurality of hose sections are to be made on the same mandrel, each is separated by such an area from the adjacent section. The mold is closed and the resulting assembly is introduced into a heated vulcanizing chamber and air or steam under pressure is introduced through bore 13 of the mandrel by means of a fitting designed for this purpose, flowing through openings 15 and into valleys of the mandrel beneath the tubular body, thereby exerting pressure thereon and forcing the tubular assembly and the reinforcement into engagement with the internal surface of the mold. Under these influences, a certain amount of flow of elastomeric material occurs and the reinforcement becomes embedded in the tubular layer while at the same time the elastomeric covering on the reinforcement becomes bonded to the tube. Pressure within the tubular body causes it to become slightly spaced from the surface of the mandrel while it is being forced to conform to the mold. As shown in FIG. 5 the cross section through the assembly taken through the crests of the mandrel with the tubular assembly thereover shows the corresponding grooves in the mold positioned over and around the reinforcing member. Since this member has a well defined circular confirmation and is selected to be somewhat smaller than the diameter of the corresponding groove in the mold, there is no problem of pinching of the tubular assembly at the dividing line between the two parts of the mold when the mold is closed. However, in the cross section shown in FIG. 6, which is taken through the valley of the mandrel and the corresponding internal corrugation of the mold, there is no reinforcement present and the closing of the mold would tend to engage or pinch the rubber tube. This is avoided since the body is retracted and drawn against the surface of the mandrel in a relatively non-stressed condition in the fluted area adjacent the juncture of the two mold sections as shown in FIG. 6. When the tubular body is formed of a vulcanizable rubber composition, vulcanization is carried out by subjecting the mold and its contents to temperatures of the order of 300 to 350 degrees F. for a period of 15 minutes to one hour to effect vulcanization of the rubber and embedding of the reinforcement therein as described above. Either natural or synthetic rubber compositions may be utilized; or, if desired, plastic elastomeric materials such as polyvinylchloride may also be used, in which case the materials are caused to flow under fluid pressure within the mold at a temperature above the softening point of the material or of the order of 300 to 350 degrees F., after which the mold is allowed to cool and then opened to remove the cooled final product. When the vulcanization or curing is completed the mold is opened and the mandrel with the cured product thereon removed therefrom. The final product may be readily removed from the mandrel by forcing it laterally therefrom or removal may be facilitated by introducing air under pressure internally of the mandrel to force the convolutions of the hose slightly away from the surface of the mandrel to minimize any tendency for sticking and to partially stretch the tubular body between reinforcements.

The final product which is produced in accordance with the method illustrated in FIGS. 1 to 6 is shown in FIG. 7, in which reinforcement member 17 is embedded within tubular body 16.

Where it is desired to use separate annular coils as reinforcement instead of a coil helical spring member, these coils may be positioned individually over the crests of the corrugations on the mandrel, said corrugations being formed in a spaced parallel manner instead of helically as in the case of the coiled reinforcement. If desired, the annular reinforcements may be formed with open ends which are abutting or overlapping so as to allow for a certain amount of expansion of each individual reinforcement. These annular reinforcements may also be precoated with elastomeric material. When utilizing annular reinforcements the final product obtained is illustrated in FIG. 8 wherein reinforcements 22 are embedded within tubular body 23.

If desired an additional tubular layer may be applied over the reinforcement after it has been positioned over the tube on the mandrel, or elastomeric or fabric tape may be wrapped over the wire to provide additional reinforcement. This is particularly desirable where bare wire is used instead of coated wire. During the molding step the wire becomes embedded between the layers.

In the practice of the invention as described above it is generally preferably to utilize a tube which has been preformed to the final diameter of the hose and wherein the internal diameter of the tube is substantially the same or even slightly greater than the external diameter of the mandrel at the corrugations. This prevents undue stressing of the elastomeric material. If this were done without the provision of the fluted or longitudinal depressions adjacent the point where the mold sections close, closing of the mold would be difficult without causing pinching or distortion of the tube. As a result, when the tube is finally blown against the interior surface of the mold by internal pressure during the cure, the final product is one in which the initial dimensions of the uncured tube conform closely to the final dimensions of the cured tube except for the formation of the corrugations. This product is thereby obtained without undue stress applied to the material during the process of making the same.

We claim:

1. Apparatus for making molded corrugated flexible hose which comprises a transversely corrugated mandrel having longitudinally fluted areas of reduced diameter adapted to be positioned within a tubular hose body to be cured, a mold having a complementary, transversely corrugated cavity formed in a plurality of longitudinal sections, said mandrel with said hose body thereon being positioned in molding relation within said mold with the transverse corrugations on the mandrel nested in the complementary corrugations in said cavity and with its fluted areas adjacent to and aligned with the junctions of said mold sections.

2. The invention as defined in claim 1 wherein the complementary corrugations on the mandrel and mold are annular.

3. The invention as defined in claim 1 wherein the complementary corrugations on the mandrel and mold are helical.

4. The invention as defined in claim 1 wherein the mandrel and mold have cooperating cylindrical portions at the end of the corrugated portion for forming a smooth cylindrical end portion for the hose.

5. The invention as defined in claim 1 wherein the mold is a two-part mold and the longitudinal flutes are diametrically opposed on said mandrel.

References Cited by the Examiner
UNITED STATES PATENTS

| | | | |
|---|---|---|---|
| 2,780,273 | 2/1957 | Roberts | 156—144 |
| 2,903,744 | 9/1959 | Harrison et al. | 18—19 |

WILLIAM J. STEPHENSON, *Primary Examiner.*

MICHAEL V. BRINDISI, *Examiner.*